US008131750B2

(12) United States Patent
Bathiche et al.

(10) Patent No.: US 8,131,750 B2
(45) Date of Patent: Mar. 6, 2012

(54) REAL-TIME ANNOTATOR

(75) Inventors: Steven N. Bathiche, Kirkland, WA (US); Shai Guday, Redmond, WA (US); Zachary Lewis Russell, Bellevue, WA (US); Boyd Cannon Multerer, Redmond, WA (US); Jon Marcus Randall Whitten, Sammamish, WA (US); Andrew David Wilson, Seattle, WA (US); Matthew B. MacLaurin, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 307 days.

(21) Appl. No.: 11/966,914

(22) Filed: Dec. 28, 2007

(65) Prior Publication Data

US 2009/0171901 A1  Jul. 2, 2009

(51) Int. Cl.
G06F 17/30 (2006.01)
G06F 17/00 (2006.01)
G06F 15/18 (2006.01)
A61B 5/00 (2006.01)
H04N 5/76 (2006.01)

(52) U.S. Cl. ........ 707/769; 707/705; 707/777; 707/913; 600/301; 715/230; 715/233; 706/61; 348/231.5

(58) Field of Classification Search .................. 345/618, 345/625, 634; 715/230–233; 704/250–251; 348/239, 231.5; 707/693–694, 749, 758, 707/795, 796, 805, 821–922, 705–706, 725, 707/769, 777; 713/168; 382/100, 115; 706/45, 706/61; 600/323, 301
See application file for complete search history.

(56) References Cited

U.S. PATENT DOCUMENTS

| | | | |
|---|---|---|---|
| 5,479,228 A | 12/1995 | Tamamura et al. | |
| 5,564,005 A | 10/1996 | Weber et al. | |
| 5,572,728 A * | 11/1996 | Tada et al. | 707/200 |
| 5,946,386 A * | 8/1999 | Rogers et al. | 379/265.09 |
| 5,995,936 A * | 11/1999 | Brais et al. | 704/275 |
| 6,035,142 A | 3/2000 | Schrock et al. | |
| 6,190,314 B1 * | 2/2001 | Ark et al. | 600/300 |
| 6,208,353 B1 * | 3/2001 | Ayer et al. | 345/634 |
| 6,636,249 B1 | 10/2003 | Rekimoto | |
| 6,674,426 B1 * | 1/2004 | McGee et al. | 345/173 |
| 6,694,387 B2 * | 2/2004 | Wagner | 710/33 |
| 6,874,018 B2 * | 3/2005 | Wu | 709/219 |
| 7,010,647 B1 * | 3/2006 | Karamchetty et al. | 711/115 |

(Continued)

FOREIGN PATENT DOCUMENTS

WO   WO 99/24968   *   5/1999

(Continued)

OTHER PUBLICATIONS

Mayank Vatsa, et al. "Face Detection Using Gradient Vector Flow", Proceedings of the Second International Conference on Machine Learning and Cybernetics, Wan, Nov. 2-5, 2003,, pp. 3259-3263.*

(Continued)

*Primary Examiner* — Srirama Channavajjala
(74) *Attorney, Agent, or Firm* — Lee & Hayes, PLLC

(57) ABSTRACT

Systems (and corresponding methodologies) that annotate experience data in real-time are provided. The real-time annotated experience data can be employed in accordance with augmented reality systems which are capable of overlaying virtual data upon real-world data. The system employs 'smart-tags' that are capable of identifying data that relates to and/or is associated with the real-world scenarios and situations.

20 Claims, 10 Drawing Sheets

U.S. PATENT DOCUMENTS

| | | | |
|---|---|---|---|
| 7,050,110 | B1 | 5/2006 | Lienhart et al. |
| 7,155,456 | B2 | 12/2006 | Abbott, III et al. |
| 7,274,822 | B2* | 9/2007 | Zhang et al. ............... 382/224 |
| 2002/0019584 | A1* | 2/2002 | Schulze et al. ............. 600/300 |
| 2002/0054059 | A1* | 5/2002 | Schneiderman ........... 345/700 |
| 2002/0075282 | A1 | 6/2002 | Vetterli et al. |
| 2003/0118974 | A1* | 6/2003 | Obrador ..................... 434/236 |
| 2004/0117638 | A1* | 6/2004 | Monroe ...................... 713/186 |
| 2004/0126038 | A1* | 7/2004 | Aublant et al. ............. 382/305 |
| 2004/0204635 | A1* | 10/2004 | Scharf et al. ............... 600/323 |
| 2004/0236830 | A1 | 11/2004 | Nelson et al. |
| 2005/0075881 | A1* | 4/2005 | Rigazio et al. ............. 704/270 |
| 2005/0101841 | A9* | 5/2005 | Kaylor et al. .............. 600/300 |
| 2005/0147303 | A1* | 7/2005 | Zhou et al. ................. 382/190 |
| 2005/0163302 | A1* | 7/2005 | Mock et al. ............. 379/211.02 |
| 2005/0256866 | A1 | 11/2005 | Lu et al. |
| 2005/0275716 | A1* | 12/2005 | Shingu et al. ............ 348/14.13 |
| 2006/0041564 | A1* | 2/2006 | Jain et al. ................... 707/100 |
| 2006/0053364 | A1* | 3/2006 | Hollander et al. .......... 715/512 |
| 2006/0166740 | A1* | 7/2006 | Sufuentes ................... 463/40 |
| 2006/0195858 | A1 | 8/2006 | Takahashi et al. |
| 2007/0162505 | A1* | 7/2007 | Cecchi et al. ............ 707/104.1 |
| 2009/0216805 | A1* | 8/2009 | Coffman et al. .......... 707/104.1 |
| 2010/0010944 | A1* | 1/2010 | Cheng et al. ............... 706/12 |
| 2010/0023553 | A1* | 1/2010 | Gausman et al. ......... 707/104.1 |
| 2011/0219325 | A1* | 9/2011 | Himes et al. ................ 715/771 |

FOREIGN PATENT DOCUMENTS

| | | | |
|---|---|---|---|
| WO | WO 2006/017280 | * | 2/2006 |
| WO | WO 2007/036838 | * | 4/2007 |

OTHER PUBLICATIONS

Robert Ward, "An analysis of facial movement tracking in ordinary human-computer interaction", Interacting with Computers 16 (2004) 879-896.*

Hisashi Aoki, et al. Realtime Personal Positioning System for a Wearable Computers. http://ieeexplore.ieee.org/iel5/6542/17464/00806642.pdf?isNumber=. Last accessed Aug. 22, 2007.

Mik Lamming, et al. "Forget-me-not" Intimate Computing in Support of Human Memory. http://www.lamming.com/mik/Papers/fmn.pdf. Last accessed Aug. 22, 2007.

Scott S. Fisher. An Authoring Toolkit for Mixed Reality Experiences. http://www.itofisher.com/PEOPLE/sfisher/Authoring_Toolkit_for_Mixed_Reality-IWEC2002.pdf. Last accessed Aug. 22, 2007.

Weiwei Xu, et al. Multimodal Archiving, Real-Time Annotation and Information Visualization in a Biofeedback System for Stroke Patient Rehabilitation. pp. 3-12. http://delivery.acm.org/10.1145/1180000/1178661/p3-xu.pdf?key1=1178661&key2=5715237811&coll=GUIDE&dl=GUIDE&CFID=31997952&CFTOKEN=92528688. Last accessed Aug. 22, 2007.

* cited by examiner

REAL-TIME ANNOTATOR

BACKGROUND

'Augmented Reality' (AR) most often relates to a field of computer research that describes a combination of real world and computer generated data. Conventionally, AR employs the use of video imagery which is digitally processed and 'augmented' with the addition of computer-generated graphics. Traditional uses of AR have been primarily focused around the gaming industry.

Most often, conventional AR systems employed specially-designed translucent goggles. These goggles enabled a user to see the real world as well as computer-generated images projected atop of the real world vision. These systems attempted to combine real-world vision with a virtual world. As well, these systems attempted to interact in real-time via a three dimensional rendering. Unfortunately, traditional systems fall short in their ability to leverage the vast amount of information now available to users.

Other common uses of AR can be seen through today's professional sports. For example, virtual advertisements projected upon a playing field or court can be accomplished by combining the real and virtual worlds. For instance, projection of the first down or line of scrimmage markers upon a football field is but another example of combining real-world with computer-generated graphics. Yet another example can be seen in a hockey game where a trail or 'tail' is projected upon a hockey puck. This trail can show both location as well as direction of a hockey puck. While these sports-related examples are not traditional interactive AR, they describe a limited ability to combine the real and virtual-computing worlds to enhance a user experience.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that can annotate experience data in real-time. In aspects, the annotated experience data can be employed in accordance with augmented reality systems which are capable of overlaying virtual data upon real-world data. These real-time annotations can be collocated in real-time and displayed via a physical-world view (e.g., display). The system can employ 'smart-tags' that are capable of identifying data that relates to and/or is associated with the real-world scenarios and situations. Accordingly, this smart-tagged data can be annotated upon the real-world scenario, for example in real-time.

In an example scenario, the annotation system can be employed to provide memory recall information. By way of specific example, upon a chance encounter with a previous acquaintance, data can be retrieved and provided (e.g., via annotations) to prompt a user (e.g., visually, audibly . . . ) of information related to the acquaintance. Here, smart-tags can be employed to locate information related to the acquaintance which can be used to remind the user how they know the acquaintance, likes/dislikes, social connections, professional connections, etc.

The innovation is capable of establishing and rendering real-time annotations when users come into contact with elements such as people or things. For example, images can be analyzed (e.g., facial recognition patterns), contextual factors can be determined, and the data can be tagged to be subsequently employed as annotations. When a match of a person is detected, a real time annotation can be presented to the user in a private manner such as inside of a lens viewer in glasses, on a portable device (e.g., smart-phone, cell phone) or in a small ear phone.

In still other aspects, the innovation can be employed to provide 'mash-ups' for sporting events as well as adaptive perspectives which incorporate wider audience considerations. Auto recipe generators can also be provided to recall how to perform certain tasks while 'smart tags' can be employed to augment data, previous memories, past associations, and to update location databases.

In yet another aspect thereof, machine learning and reasoning mechanisms are provided that employ a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
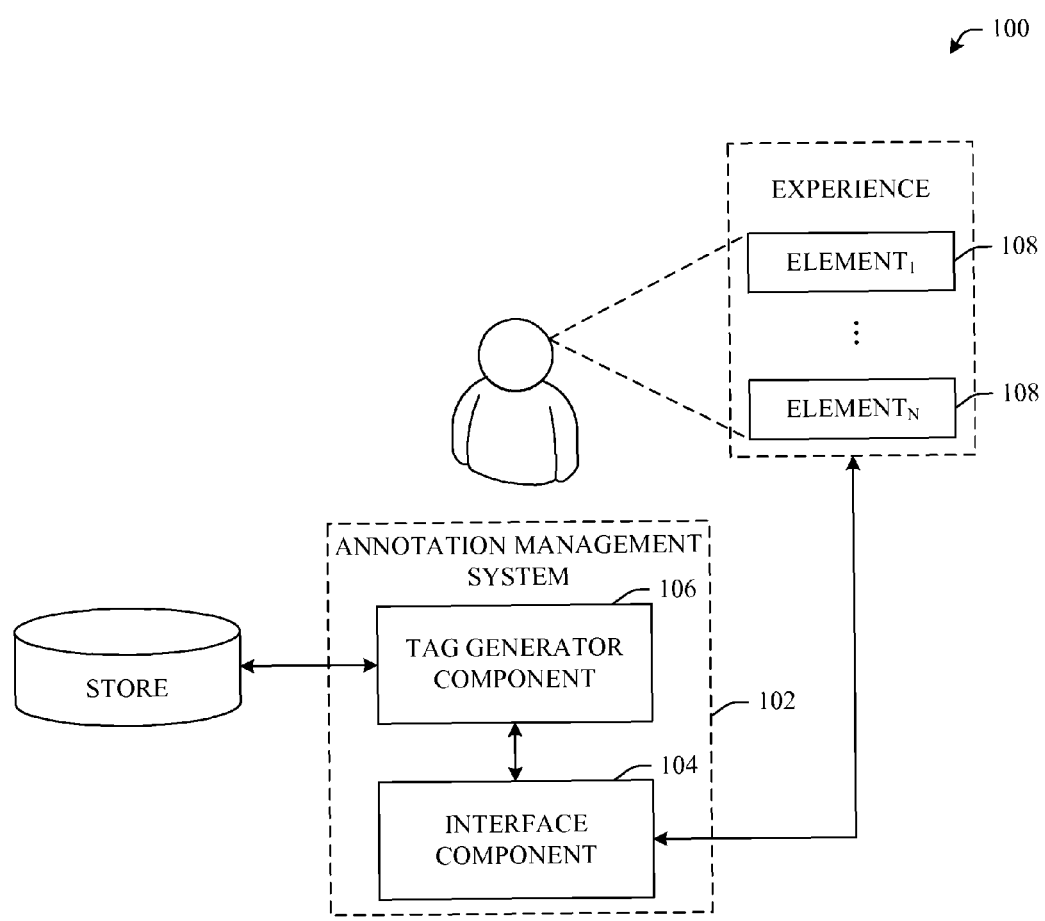
FIG. 1 illustrates an example system that establishes smart-tags in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that enables data to be captured which can be subsequently annotated upon reality-based elements. In operation, 'smart-tags' can be employed to associate stored and indexed data to real-time data elements. As illustrated in FIG. 1, system 100 includes an annotation management system 102 that includes an interface component 104 and a tag generator component 106. Essentially, FIG. 1 illustrates that system 100 can be employed to dynamically tag and store information related to elements 1 to N of an experience, where N is an integer. It is to be understood that 1 to N elements can be referred to individually or collectively as elements 108.

This specification addresses two portions of a real-time annotation system, namely, tagging and annotating. FIG. 1 describes an aspect of the innovation related to components that facilitate tagging and indexing information that can subsequently be used for annotation of reality experiences. Other components which facilitate employment of the tagged information to annotate experiences in real-time will be described with reference to the figures that follow. While specific examples are described herein, these examples are provided to add perspective to the features, functions and benefits of the innovation. Accordingly, these examples are not intended to limit the innovation in any manner. Rather, it is to be understood that countless examples of the features, functions and benefits of the innovation exist, all which are to be considered within the scope of this specification and claims appended hereto.

The interface component 104 can employ sensory mechanisms to monitor elements 108 related to an experience. The elements 108 can be most any factor, parameter or criteria related to an experience. As well, the elements can be directed to contextual factors that relate to the elements 108 in a situational manner. In operation, the interface component 104 can automatically capture and tag data related to elements within an experience.

The tag generator component 106 can apply a tag to the collected data and subsequently facilitate storage into a local and/or remote storage facility. Still further, the tag generator component 106 can incorporate contextual factors—these tags can be referred to herein as 'smart tags' as they not only describe the data but, also situational or contextual factors (e.g., time, location, state, mood . . . ) associated with the data.

In a specific example, the interface component 104 can automatically detect a user action or engaged activity. This information can be tagged to a file generated which relates to the real-world experience. For instance, suppose a user is preparing a consolidation of financial information for their yearly income taxes and, in the course of doing do, generates a particular spreadsheet. Here, the interface component 104, together with the tag generator component 106 can tag the document with identifiers related to the content of the document (e.g., income statements, W2 statements, charitable amounts) as well as contextual factors such as, preparation of income taxes, prepared for accountant John Doe, federal, state, local, etc. Thus, if a later action of preparing tax documents is detected, the user can be automatically presented with the appropriate documents or, alternatively, the name (or hyperlink) of the spreadsheet can be provided to a user by way of a visual or audio queue or annotation.

Similarly, in another example, factors such as places visited, businesses patronized, activities engaged, as well as other patterns can be automatically captured, tagged and stored by the annotation management system 102. Accordingly, as will be described below, the system can present this information to the user (e.g., via annotations) in order to establish a rich real-world experience which can assist in streamlining information gathering, decision making, learning, memory enhancement or the like. While examples described are directed to auto-tagging of real-time data, it is to be understood that the interface component 104 also enables items to be manually tagged in accordance with aspects of the innovation.

In another particular example, the system can determine that a viewer of a sporting event is also involved and interested in 'fantasy' sports (e.g., fantasy football). In this example, based upon gathered information, the system can determine fantasy rosters in a particular fantasy league. While watching the sporting event, the system can provide a 'mash-up' which essentially reveals the fantasy-owner of specific players and their respective fantasy-score which correlates to the player's performance on the real-world field. This mash-up information can be automatically projected upon the players in real-time as they play on the real-world field.

Figure 2:
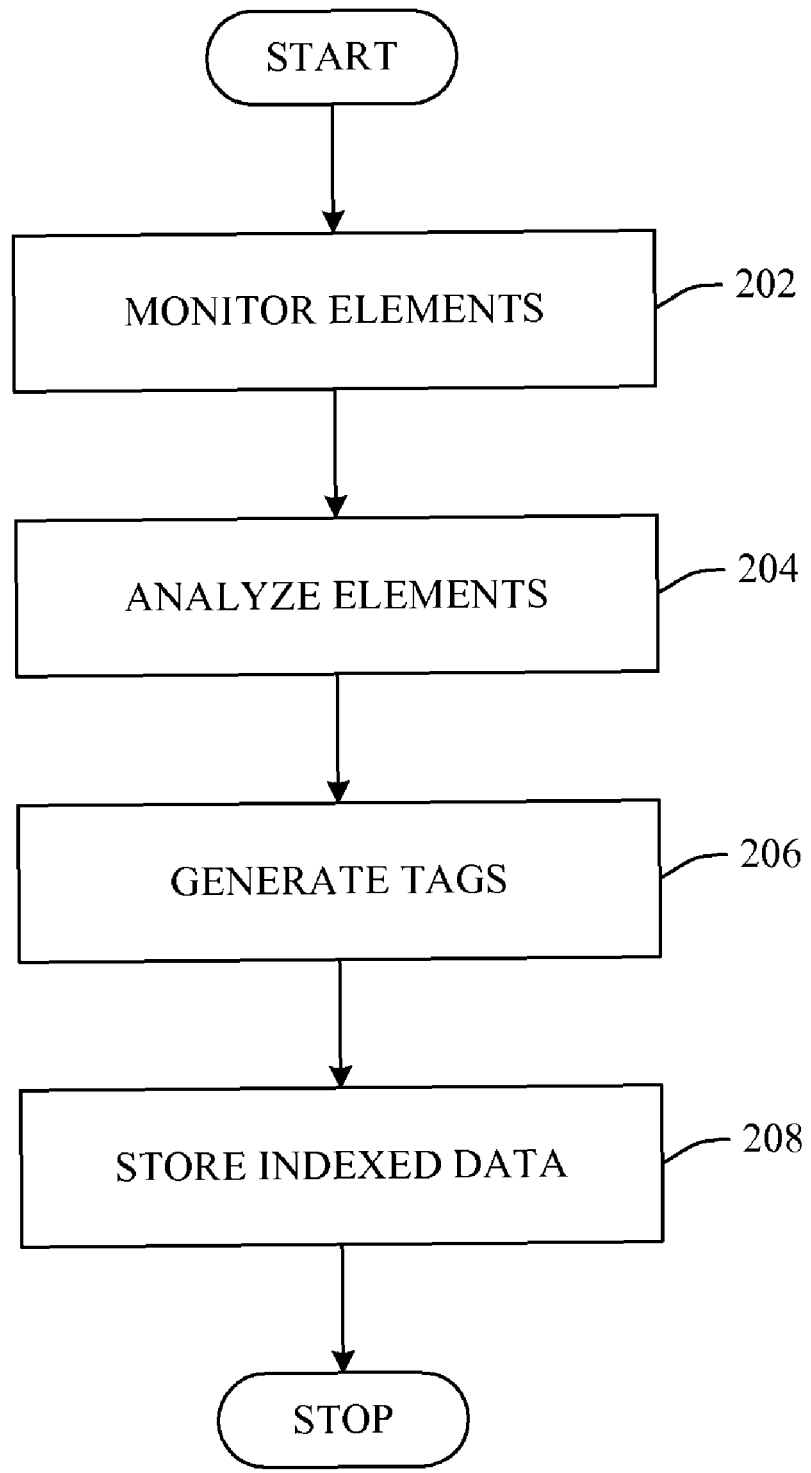
FIG. 2 illustrates an example flow chart of procedures that facilitate establishment of smart-tags in accordance with an aspect of the innovation.

FIG. 2 illustrates an example methodology of augmenting reality in real-time by tagging data elements in accordance with an aspect of the innovation. This example methodology illustrates a flow chart of procedures associated with monitoring elements and generating tags in real-time. In operation, this methodology enables elements to be monitored and tagged in real-time thereafter effecting real-time annotations.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

In the automated tagging example, at 202, data elements in real-time are monitored. As described above, these data elements can include actual activity data as well as other contextual factors that coincide with the activity data. The captured or monitored data elements are analyzed at 204. For example, pattern recognition, speech recognition, content analysis, etc. mechanisms can be employed to analyze the elements thereby identifying content, objects, etc.

At 206, tags (e.g., 'smart-tags') can be established that describe the captured elements. Additionally, the tags facilitate association of data elements which enable real-time annotation as described infra. For instance, in a real-time annotation scenario, context can be established and mapped to data elements by way of these smart-tags. Accordingly, real-time annotations can be provided to a user, for example, by way of a mash-up, pop-up, overlay or the like.

Once the tags are generated, they can be indexed and stored at 208. By way of example, the tags can be maintained in a local store, a remote store or a combination of a local and remote store. Still further, although not illustrated in FIG. 2, it is to be understood that other supplemental and/or descriptive data can be searched and associated to the data elements, for example, via the Internet.

Figure 3:
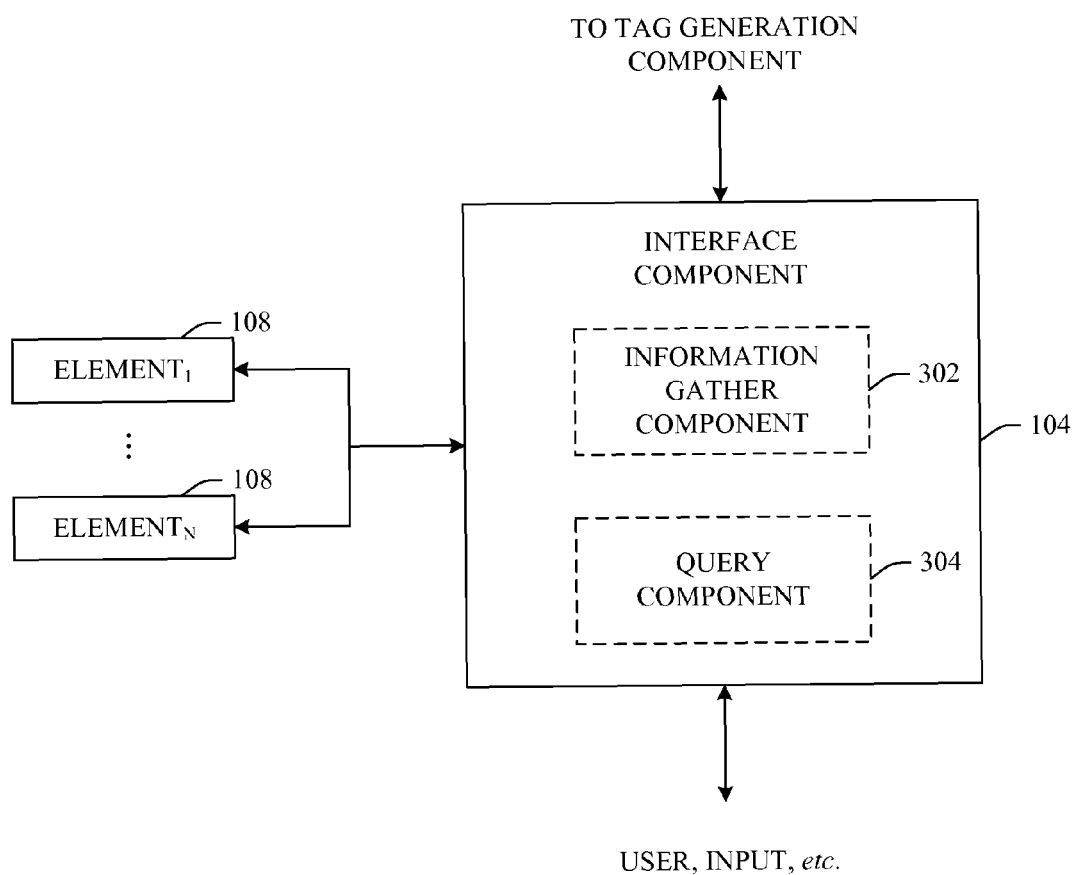
FIG. 3 illustrates an example interface component in accordance with an aspect of the innovation.

Turning now to FIG. 3, an example block diagram of an interface component 104 in accordance with an aspect of the innovation is shown. Generally, the example interface component 104 can include an information gather component 302 and a query component 304. Essentially, the interface gather component 302 enables automatic retrieval or manual assembly or collection of information. The query component 304 can be employed to supplement data gathered by way of external sources, for example, via the Internet.

Further, as illustrated in FIG. 3, the information gather component 104 can automatically retrieve, access or otherwise obtain element information. For example, sensory mechanisms can be employed to establish context and descriptive factors related to elements 108. Additionally, a user (or group of users) can manually input data which can later be used for annotation.

Figure 4:
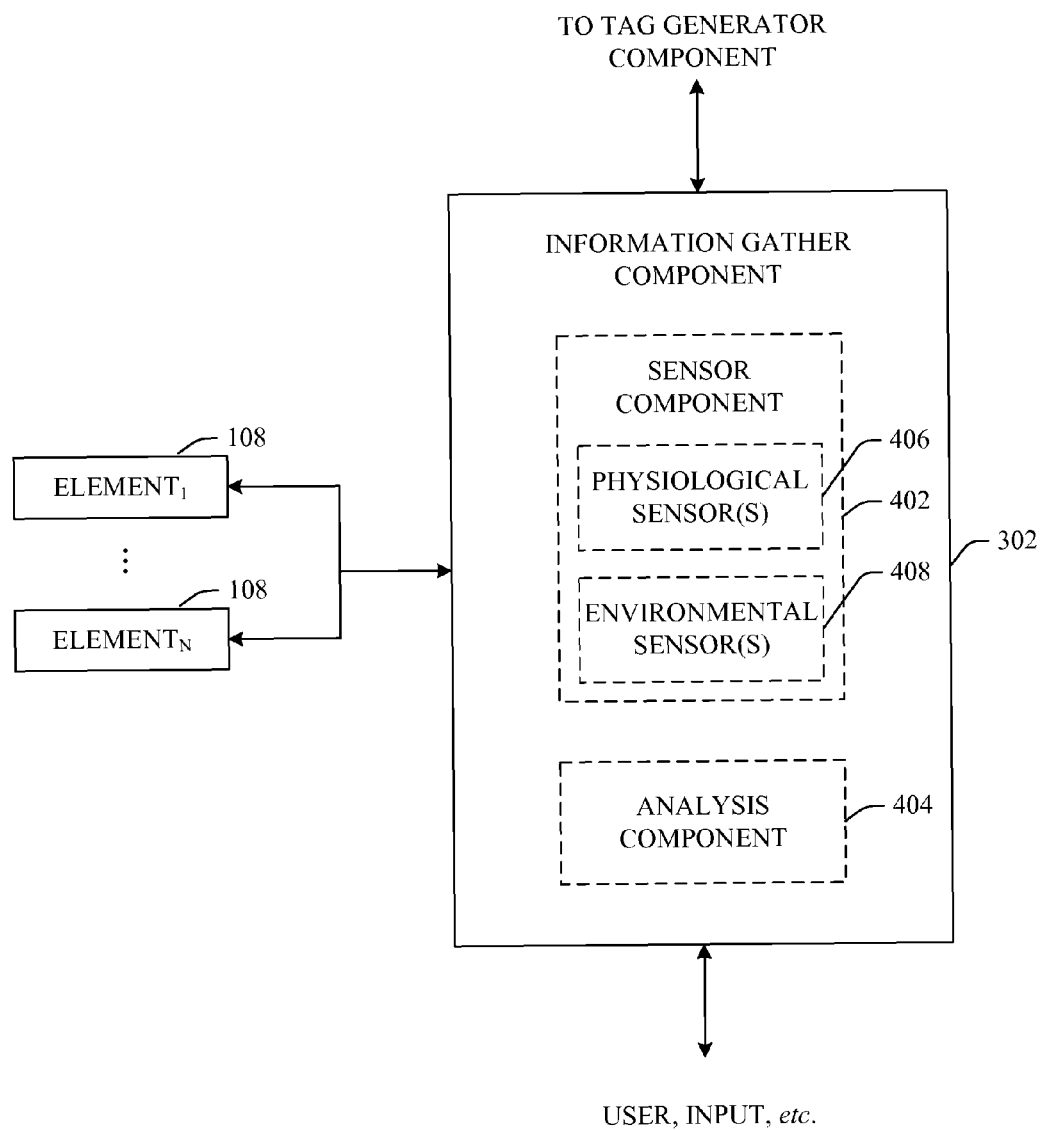
FIG. 4 illustrates an example interface component that employs physiological and environmental sensors in accordance with an aspect of the innovation.

FIG. 4 illustrates an example block diagram of an information gather component 302. Essentially, FIG. 4 illustrates that the information gather component 302 can include a sensor component 402 and an analysis component 404. In operation, these sub-components (402, 404) facilitate assembly (or collection) of information and subsequent analysis to determine type and characteristics of the data. The sensor component 402 can include physiological sensors 406 as well as environmental sensors 408. These sensory mechanisms can be employed to establish contextual factors as well as to gather the data elements 108.

In a particular example, suppose a user is watching a football game, here the information gather component 302 can establish, e.g., via input, that the user is watching a football game between two particular teams. Additionally, sensor components 402 can be employed to establish particular players on the field, individuals in proximity, etc. Still further, the query component 304 can be employed to access team roster information, fantasy roster information, statistics, etc. Thus, this information can be tagged and stored as described supra, or alternatively, can be rendered in real time, e.g., in the form of a mash-up.

In another example, the system can establish that a user is performing a technical task, e.g., calibrating an oscilloscope. As such, the system can record the order of actions, problems encountered, troubleshooting procedures, etc. These elements can be tagged and saved for subsequent annotation. Additionally, the system can record the user's skill level, prior calibration tasks, etc.—this information can be used to determine appropriate annotations for subsequent users.

In operation, when another user performs the same (or similar task), the system can monitor physiological criteria to determine when annotations are necessary. For example, the system can detect a frustration level of a user. Thereafter, annotations can be provided to assist a user in calibration. For instance, arrows or other video queues can be provided to assist a user to know switches to toggle, knobs to adjust or the like. While this example has been provided to add perspective to the innovation, it is to be understood that countless examples exist which employ the smart-tagging and annotation techniques described herein. These additional examples are to be included within the scope of this innovation and claims appended hereto.

Figure 5:
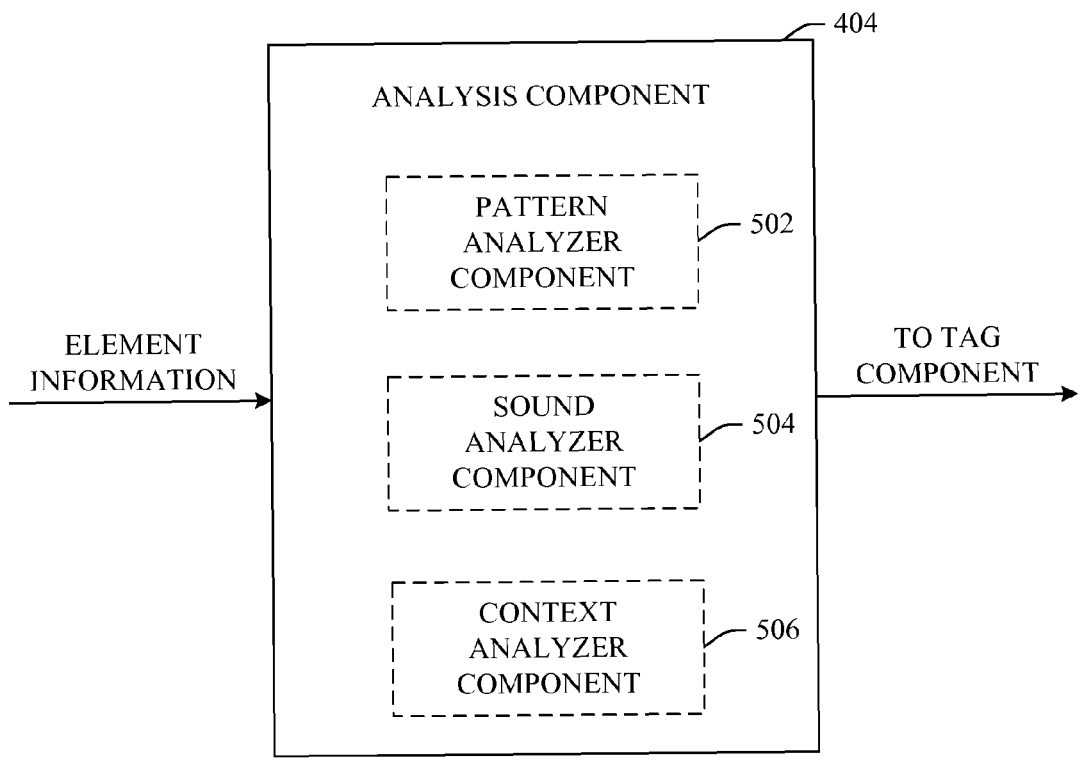
FIG. 5 illustrates an example analysis component in accordance with an aspect of the innovation.

Turning now to FIG. 5, a block diagram of an example analysis component 404 is shown. The example component 404 includes a pattern analyzer component 502, a sound analyzer component 504 and a context analyzer component 506—each of these sub-components can be employed to establish factors, parameters and other criteria associated to the gathered information. As shown, the result of the analysis can facilitate establishment of the tags. One such type of information gathered is context information. As described herein, this context information enables intelligent and comprehensive annotation.

Figure 6:
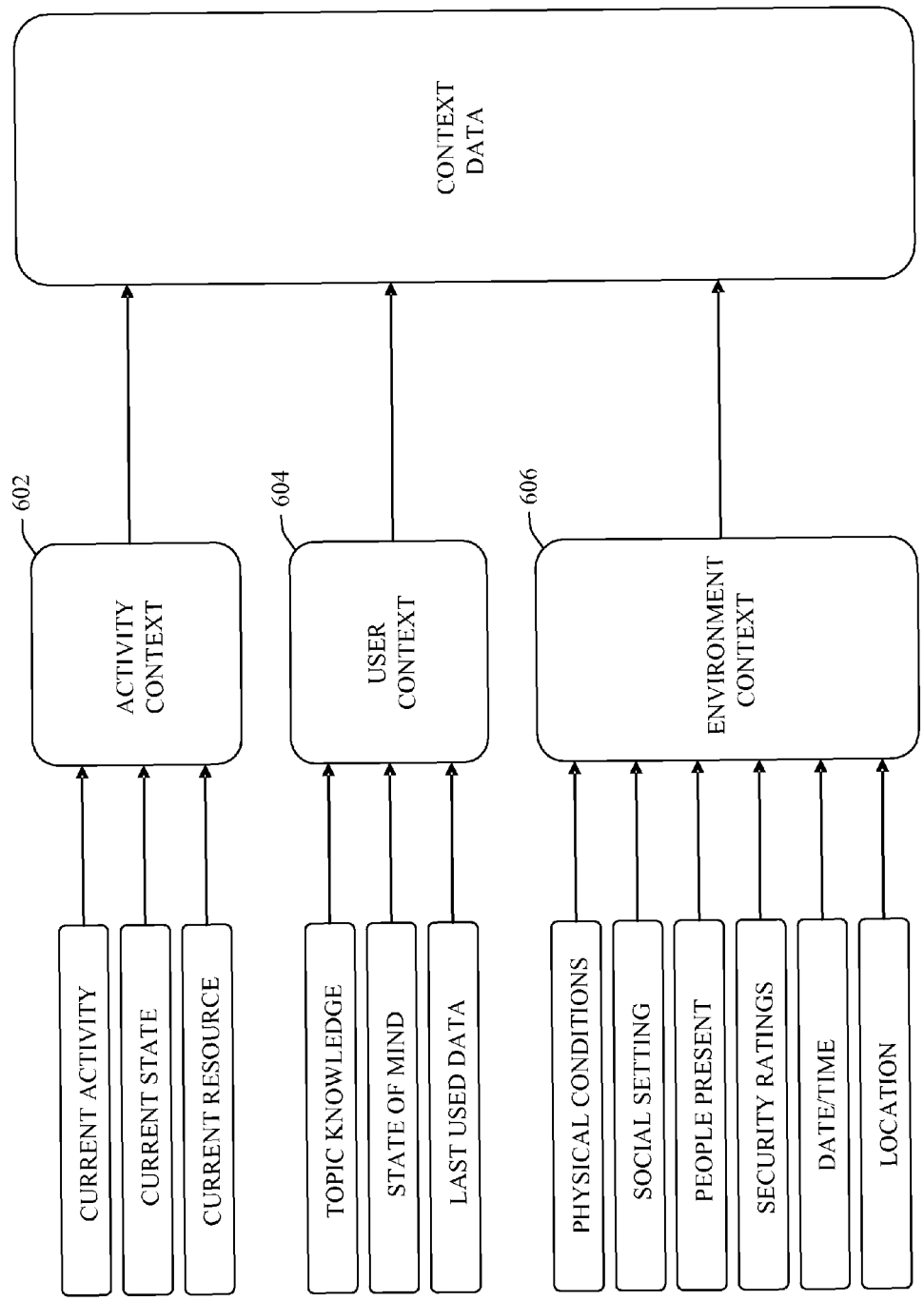
FIG. 6 illustrates example contextual data in accordance with aspects of the innovation.

FIG. 6 illustrates a sampling of the kinds of data that can comprise context data captured in accordance with the innovation. In accordance with the aspect illustrated in FIG. 6, the context data can be expressed in at least 3 classes: activity context 602, user context 604, and environment context 606.

By way of example, and not limitation, the activity context data 602 can include the current activity the user is performing. It is to be understood that this activity information can be explicitly determined and/or inferred (e.g., by way of machine learning and reasoning (MLR) mechanisms). Additionally, the activity context data 602 can include the current state (if any) within the activity. Moreover, the activity context data 602 can include a current resource (e.g., file, application, gadget, email, etc.) that the user is interacting with in accordance with the activity.

In an aspect, the user context data 604 can include topics of knowledge that the user knows about with respect to the activity and/or application. As well, the user context data 604 can include an estimate of the user's mood or state of mind (e.g., happy, frustrated, confused, angry, etc.). The user context 604 can also include information about when the user most recently used the current activity, step, resource, etc.

It will be understood and appreciated that the user's state of mind can be estimated using different input modalities, for example, the user can express intent and feelings, the system can analyze pressure and movement on a mouse, verbal statements, physiological signals, etc. to determine state of mind.

With continued reference to FIG. 6, the environment context data 606 can include the physical conditions of the environment (e.g., wind, lighting, ambient, sound, temperature, etc.), the social setting (e.g., user is in a business meeting, or user is having dinner with his family), the other people who are in the user's immediate vicinity, data about how secure the location/system/network are, the date and time, and the location of the user. As stated above, although specific data types are identified in FIG. 6, it is to be understood that additional types of data can be included within the context data. As well, it is to be understood that this additional data is to be included within the scope of the disclosure and claims appended hereto.

Figure 7:
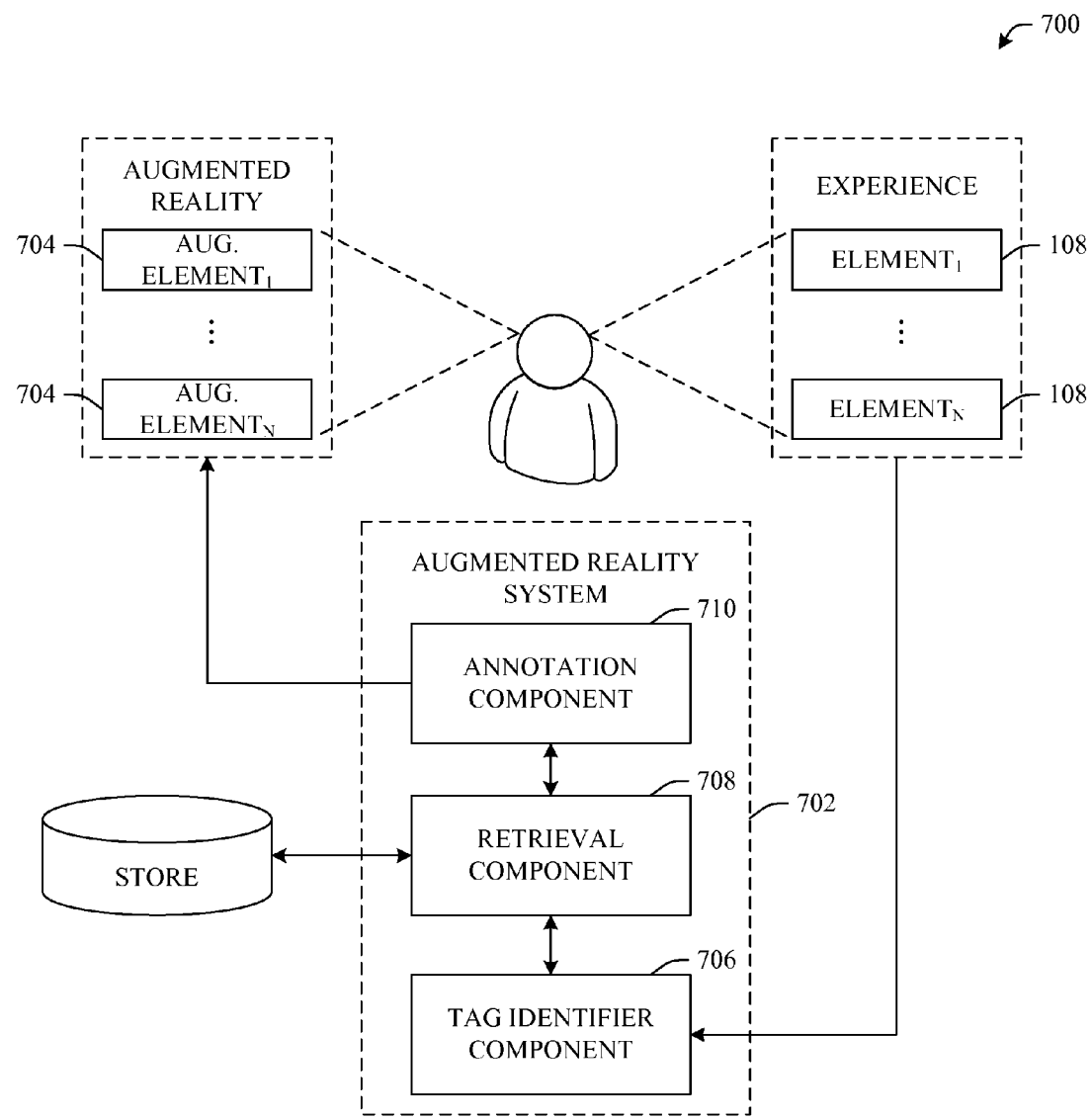
FIG. 7 illustrates an example reality annotation system that facilitates real-time annotation in accordance with an aspect of the innovation.

While FIGS. 1-6 are directed to systems (and methodologies) of establishing tagged elements (e.g., smart-tagged elements which incorporate context), FIG. 7 illustrates a block diagram of a system 700 that employs the elements to enable real-time annotations. Generally, system 700 illustrates a reality annotation system 702 that monitors elements in real time (108) and subsequently provides an annotated version of the elements (e.g., augmented elements 704). Essentially, system 700 enables annotations to be provided in real-time which effectively provide a user with a richer more comprehensive rendering of reality.

For instance, oftentimes people or places are encountered and it seems impossible to recall any relevant information regarding the respective person or place. Sometimes, so as to not to appear rude, people will follow along in conversation as if they remember the person, yet they have no idea who they are talking to or what the context is of a current conversation. Most often, the only choice is to interrupt the present conversation or exchange of data, ask to be reminded, and carry on with the previous conversation once reminded of the association and/or identity of the encountered person.

In this scenario, the system 700 can provide real time annotations to users as they come in contact with people or things. For example, as described with reference to FIGS. 1-6, images can be stored and facial recognition patterns determined and tagged. Other analyses can include audio patterns or other sensors.

When a match of a person is detected, a real time annotation can be presented to the user in a private matter such as inside of a lens viewer in glasses or in a small ear phone. Most any mechanism of rendering is to be included within the scope of the innovation and claims appended hereto. In a particular example, if a person were out shopping and approached by someone they did not recognize, a real time annotation can be provided to let that person know who they are talking to and other information such as what were the previous interactions with the person. This information can be located by way of smart-tags or other suitable indexing or tagging mechanisms. In a similar vein, if a person were to visit a location they had previously visited, annotations could be provided that remind the person of the past experiences.

As illustrated, the reality annotation system 702 can include a tag identifier component 706, a retrieval component 708 and an annotation component 710. In operation, the tag identifier component 706 can analyze elements 108 associated with a current experience as well as context associated therewith. Accordingly, tags can be identified which are related to the elements (108) in view of the context.

The retrieval component 708 can access a store (local, remote or combination thereof) to retrieve, access or otherwise obtain information for annotation. The annotation component 710 can be employed to render the annotations in real-time, for example as augmented elements 704. Effectively, the innovation can annotate objects and experiences in real-time thereby providing enhanced information by way of a comprehensive and rich data presentation.

As described herein, system 700 can provide memory enhancements (e.g., mash-ups for sporting events) and adaptive perspectives which can incorporate wider audience considerations. The annotation functionalities of the innovation can provide auto recipe generators that assist in recall of how to perform certain tasks while 'smart-tags' can be employed to augment stored data, previous memories, past associations, and to update location databases.

Yet other aspects include real world co-opting of data and storing data from brain/machine interface devices. This can include dream recording and playback. Such memory enhancements provided by this innovation can enable such aspects as location-less expertise and remote intelligence. It is to be understood that the applications of the annotation functionalities are endless. Accordingly, these countless aspects are to be included within the scope of this disclosure and claims appended hereto.

Figure 8:
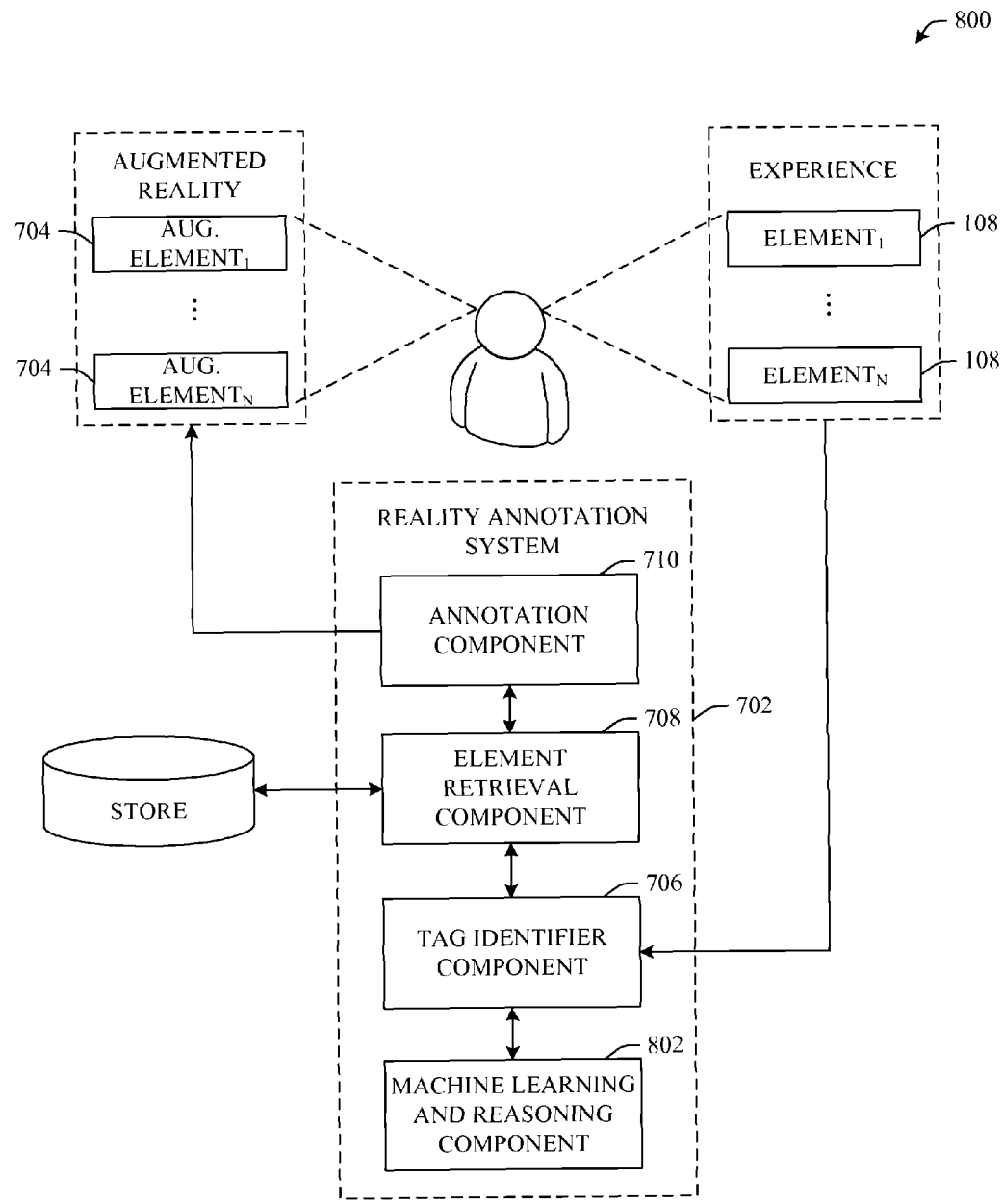
FIG. 8 illustrates an architecture including machine learning and reasoning-based component that can automate functionality in accordance with an aspect of the innovation.

FIG. 8 illustrates a system 800 that employs a machine learning and reasoning (MLR) component 802 which facilitates automating one or more features in accordance with the subject innovation. The subject innovation (e.g., selection of annotations, generation of tags . . . ) can employ various MLR-based schemes for carrying out various aspects thereof. For example, a process for determining when/how to annotate real-world data can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to annotate, how to annotate, what to information to annotate, how to render the annotation, what information to gather, what information to tag, how to tag information, etc.

Figure 9:
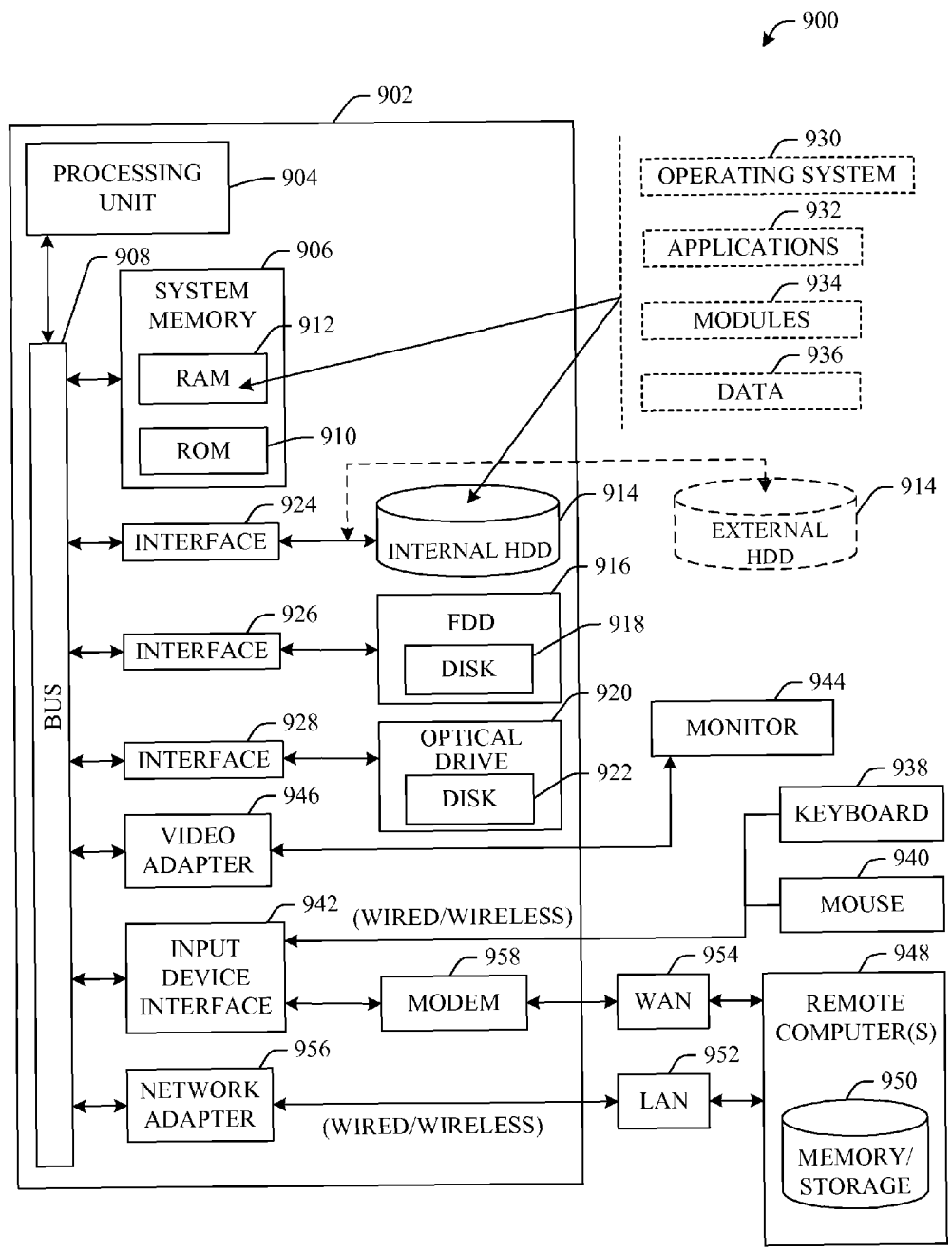
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated.

The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
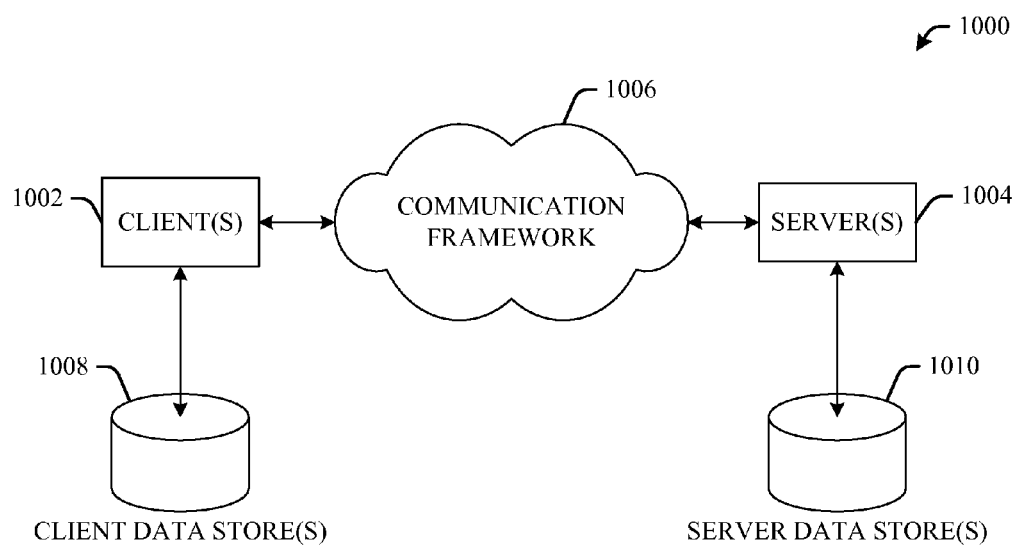
FIG. 10 illustrates a schematic block diagram of an example computing environment in accordance with the subject innovation.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices). The client(s) 1002 can house cookie(s) and/or associated contextual information by employing the innovation, for example.

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a processing unit;
   a memory coupled to the processing unit;
   an interface component maintained on the memory and executed on the processing unit to monitor parameters and contextual factors related to an experience;
   a context analyzer component that establishes the parameters and the contextual factors based on at least on a user's state of mind associated with the experience, to facilitate establishing tags for the parameters and the contextual factors;
   a tag generator that applies a tag to the parameters based on detecting the user's state of mind, wherein the tag includes a smart tag describing the contextual factors associated with the user's state of mind associated with the experience;
   a tag identifier component that associates a plurality of tags related to the user's state of mind associated with the experience to real-time elements, wherein the plurality of tags includes the smart tag;
   a retrieval component that accesses tagged data related to the user's state of mind;
   an annotation component that annotates the experience in real-time with the accessed data to provide memory recall information to assist a user based on the user's state of mind associated with the experience; and
   the smart tag that presents real-time annotation inside at least one of a lens viewer in glasses or a small ear phone.

2. The system of claim 1, wherein the tag identifier component employs at least one of facial recognition, pattern recognition, speech recognition, audio analysis or text analysis to establish the plurality of tags.

3. The system of claim 1, wherein the annotation component renders the annotated experience via at least one of a visual or audio device.

4. The system of claim 1, further comprising an annotation system that tags the data related to a plurality of user experiences in view of contextual factors.

5. The system of claim 4, further comprising the interface component that receives the data related to elements.

6. The system of claim 5, further comprising an information gather component that collects the data related to the elements via a sensory mechanism.

7. The system of claim 6, wherein the sensory mechanism is at least one of a physiological or environmental sensor.

8. The system of claim 6, further comprising a query component that employs a query to supplement the collected data with data from a network-based source.

9. The system of claim 6, further comprising:
an analysis component that determines criteria related to the collected data; and
the tag generator component that generates the tags based upon a subset of the criteria.

10. The system of claim 9, further comprising:
a pattern analyzer component that identifies at least one of identity of an individual or object; and
the tag generator component that generates the tags based upon a subset of the criteria.

11. The system of claim 9, further comprising:
a sound analyzer component that identifies at least one of identity of an individual or object; and
the tag generator component that generates the tags based upon a subset of the criteria.

12. The system of claim 9, further comprising:
the context analyzer component that establishes context that further includes at least one of an activity context or environment context; and
the tag generator component that generates the tags based upon a subset of the context.

13. The system of claim 1, further comprising a machine learning and reasoning component that employs at least one of a probabilistic and a statistical-based analysis that infers an action that a user desires to be automatically performed.

14. A computer-implemented method comprising:
monitoring, by a processing unit of a computer, an element of an experience, wherein the element includes activity data;
automatically detecting, by the processing unit, a user action related to the element of the experience in real-time;
analyzing the element of the experience by identifying content;
based on the analysis, generating a plurality of tags that describe the element of the experience in real-time;
employing the analysis to identify the plurality of tags;
annotating the element in real-time with the activity data identified by a subset of the tags, the subset of tags include information related to an acquaintance, a social connection with the acquaintance, and a like or a dislike of the acquaintance; and
presenting real-time annotation of the element with the activity data identified by the subset of tags to a user in a mash-up a pop-up, or an overlay, the overlay includes overlaying virtual data over the experience in real-time.

15. The computer-implemented method of claim 14, wherein the act of analyzing includes at least one of analyzing a pattern, analyzing a sound, or analyzing a context of the element.

16. The computer-implemented method of claim 14, further comprising retrieving the activity data identified by the subset of the tags from a network-based source.

17. The computer-implemented method of claim 14, further comprising:
monitoring a disparate set of elements;
identifying data related to a subset of the disparate set of elements; and
tagging the data based upon content in view of context.

18. A system comprising:
a processing unit;
a memory coupled to the processing unit;
an annotation component maintained on the memory and executed on the processing unit to determine when to annotate real-time data by an automatic classifier system;
an interface component for monitoring experiences of a user;
a pattern analyzer component for analyzing elements of a subset of the experiences;
a context analyzer component for establishing the elements based on a user's state of mind in response to the experiences;
a tag generator component for generating tags associated to the elements based upon the analysis and the user's state of mind;
the tag generator component further comprising indexing data related to the elements as a function of the tags;
the tag generator component further comprising storing the indexed data;
the pattern analyzer component further comprising annotating the indexed data based on the user's state of mind with the real-time data; and
the annotation component presenting the real time annotation through at least one of a lens viewer in glasses or on a small ear phone.

19. The system of claim 18, the annotation component further comprising annotating an experience of a disparate user in real-time based upon the indexed data.

20. The system of claim 19, wherein:
the interface component further comprises monitoring experiences of the disparate user; and
the pattern analyzer component further comprises analyzing the experiences, wherein the analysis is employed to locate or retrieve the indexed data.

* * * * *